United States Patent [19]

Corbin et al.

[11] Patent Number: 4,646,227
[45] Date of Patent: Feb. 24, 1987

[54] CONTROL SYSTEMS

[75] Inventors: Malcolm J. Corbin, Farnham; John G. Jones, Esher, both of United Kingdom

[73] Assignee: The Secretary of State for Defense in Her Britannic Majesty's Government of the United Kingdom of Great Britain and Northern Ireland, United Kingdom

[21] Appl. No.: 577,885

[22] Filed: Feb. 7, 1984

[30] Foreign Application Priority Data

Feb. 7, 1983 [GB] United Kingdom ............... 8303324

[51] Int. Cl.$^4$ .............................................. G05B 9/02
[52] U.S. Cl. ...................................... 364/184; 371/24; 364/553
[58] Field of Search .............. 364/184, 604, 728, 819, 364/553; 371/24

[56] References Cited

U.S. PATENT DOCUMENTS 4,289,019  9/1981  Claytor ............................... 364/821

FOREIGN PATENT DOCUMENTS 1092690  12/1967  United Kingdom ............... 371/24

OTHER PUBLICATIONS

Correlation Entering New Fields with Real Time Signal Analysis; B. LuBow; Instrumentation; *Electronics;* Oct. 31, 1966; McGraw-Hill, N.Y., N.Y.
*Error Detecting Logic for Digital Computers;* F. Sellers et al; McGraw Hill; 1968; pp. 221-225.

*Primary Examiner*—Jerry Smith
*Assistant Examiner*—Allen MacDonald
*Attorney, Agent, or Firm*—Cushman, Darby & Cushman

[57] ABSTRACT

In a control system monitor signals are received from points in the controlled system. The signals are band limited by filters respectively to provide matched band limited signals for correlation by comparison logic to provide failure flag output. The invention is based on the realization that signals in different parts of the system should correlate if suitably conditioned, and that the result of the correlation is indicative of performance.

5 Claims, 15 Drawing Figures

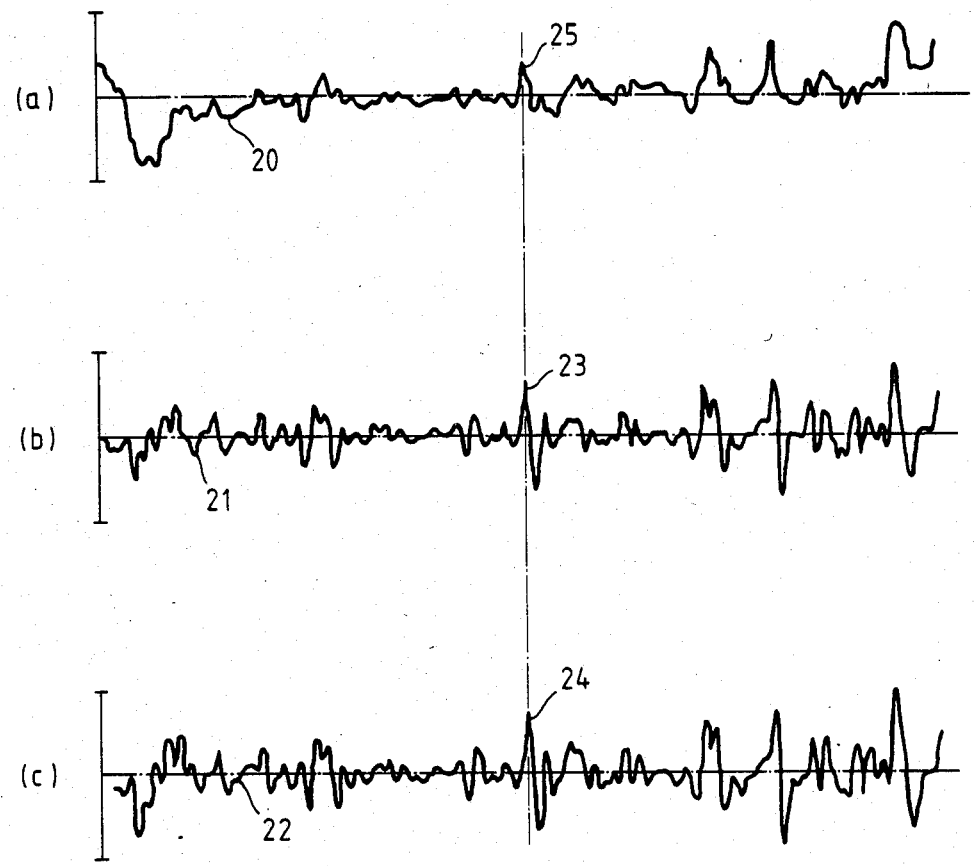

BROAD-BAND WAVE PACKET IN SIGNAL GRADIENT

SMOOTH INCREMENT IN x(t) OBTAINED BY INTEGRATION

WAVE PACKET (IN SIGNAL GRADIENT)
WITH SIDE BANDS SUPPRESSED

SMOOTH INCREMENT IN x(t)
OBTAINED BY INTEGRATION

CONTROL SYSTEMS

FIELD OF THE INVENTION

This invention relates to control systems and in particular to monitors for control systems with a view to providing a positive indication of correct system operation and identifying system failures.

BACKGROUND OF THE INVENTION

In large systems it is important to ensure that control is not lost due to failure of a system component. A common approach is to provide redundancy by duplication and comparison.

Failure tolerance in fly-by-wire aircraft control systems for example is normally achieved by means of multiple lanes of identical hardware, including sensors, actuators and computers. Two disadvantages of this approach are the weight penalty paid and the possibility of a common-mode (design) failure of the system. The latter is particularly relevant in the context of the current trend towards digital implementation of control laws, in which the possibility of software-design errors arises. A tool that is relevant to the alleviation of both these problems is 'analytical redundancy', an expression denoting the use of additional on-board computing to monitor system health in terms of the mutual consistency of dissimilar signals. This technique makes use of analytical relationships among signals, such as outputs from pitch-rate and acceleration sensors, or a sensor output and a computer output (eg an actuator-demand signal), derived from theoretical models of system behaviour.

In prior art suggestions for the implementation of analytical redundancy extensive use has been made of the technique of Kalman filtering and associated state-space models of systems, together with Gaussian models of external disturbances and minimum-mean-square criteria. A useful review of prior art techniques was presented in AGARD lecture series No. 109 (1980) entitled, "Fault tolerance design and reduncancy management techniques."

In order to realize a practical system based on Kalman filtering, sharpness of response to significant transient inputs (for example pilot demands, or sudden wind gusts) is sacrificed in order to provide noise suppression. The present invention arose out of studies aimed at placing less emphasis on noise suppression and more on good resolution of the transient effects of inputs occurring during normal system operation. An additional consideration was the desirability of on-line monitoring, where normal system inputs provide the test, without recourse to special test procedures, or running testing software.

SUMMARY OF THE INVENTION

According to the present invention a control system monitor includes means for receiving signals from points in the system, means for band limiting each signal, means for correlating the band limited signals and means for examining the correlation to indicate a system failure if a predetermined correlation level is not satisfied.

Preferably, following band limiting, each signal is shaped in the time domain such that correlation may be performed by means of a continuous comparison.

In a preferred form of the present invention the means for band limiting is responsive to a particular received input, which may advantageously be an increment such that the means for band limiting comprises an increment detector. The increment detectors are preferably configured to provide matched filters, such that the filter outputs may be directly compared.

Measurements may be related to inputs both directly and indirectly. Where inputs are indirectly measured a filter may be advantageously included which is complementary to the transfer function of the part of the controlled system providing the indirect measurement such that the transfer function and the complementary filter together provide the band limiting, preferably in the form of an increment detector.

It will be appreciated that the present invention involves generation and cross-comparison of band-limited signals, and the realization that, while dissimilar signals may differ widely when viewed over a wide bandwidth and require relatively high-order analytical modelling in order to verify their overall mutual consistency, over limited pass bands there may be shown to exist simple relationships which, after appropriate filtering, can be verified by using comparison logic. The band-limiting filters employed may be designed such that the comparison signals are not only constrained to have prescribed common passbands in the frequency plane, but are also tailored to have a common time-plane signature in response to identifiable features of external inputs such as pilot demands or gusts. As a result of these constraints, dissimilar signals recorded at different points in the system, such as pilot control-stick transducer, rate-sensor, accelerometer or actuator-demand, lead after filtering to pairs of derived band-limited signals sufficiently closely matched to be used for cross-comparison purposes. Significant disparities between fluctuations in matched channels, exceeding prescribed thresholds, may be detected by appropriate logic and interpreted as indications of possible system failure. Use of a sufficient number of such matched channels allows not only the recognition that a failure has occurred but also an identification of the failed component.

BRIEF DESCRIPTION OF THE DRAWINGS

In order that features and advantages of the present invention may be appreciated some examples will now be described with reference to the accompanying diagrammatic drawings of which:

FIG. 2 represents an example of the operation of a control system monitor.

DETAILED DESCRIPTION OF THE INVENTION

Figure 1:
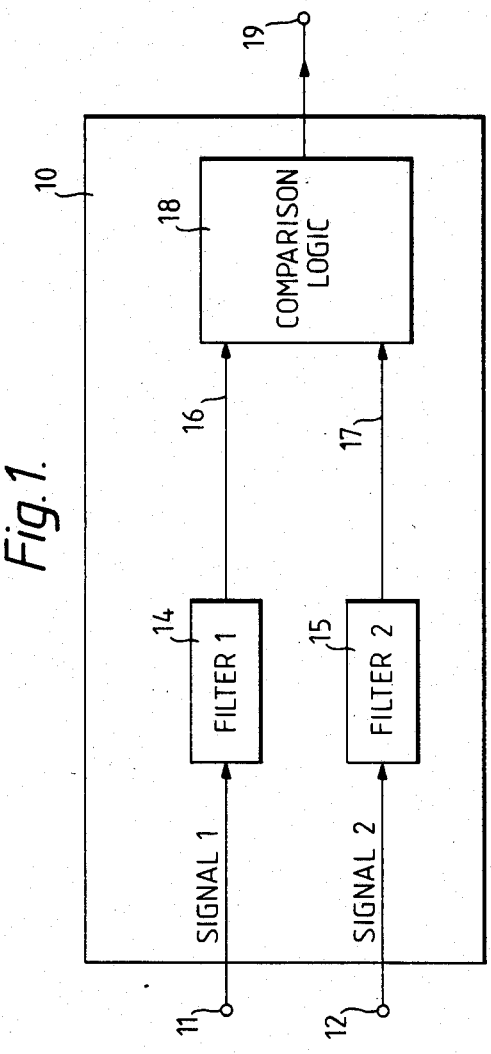
FIG. 1 represents a control system monitor.

In a control system monitor 10 (FIG. 1) signals 11, 12 are received from points in the controlled system (not shown). The signals are band limited by filters 14, 15 respectively to provide matched band limited signals 16, 17 for correlation by comparison logic 18 to provide a failure flag output 19. Examples of the signals 11, 12 and 16, 17 have been obtained from recordings made during simulated flight (FIG. 2). Trace 20 represents a time history of longitudinal control-stick input to a simulated aircraft control system. Trace 21 represents the filtered pitch rate response which is equivalent to the output of a pitch rate sensor filtered by a first-order high pass filter. Trace 22 is the output of a band limiting filter to which an input represented by trace 20 is applied. It will be realized that traces 21 and 22 correspond to signals 16 and 17 respectively (FIG. 1) and that these signals fluctuate in a closely related manner susceptible to comparison. It will be noted that common peaks in the signals, such as peaks 23 and 24 correspond to recognizable events in the control input, such as demand event 25.

In order that features and advantages of the present invention may be further understood and appreciated a theoretical presentation of its operation will now be developed.

The present invention is not based on state-space modelling and Kalman filtering techniques, but on a distinct mathematical background concerning the information content of fluctuating signals, in which signals are decomposed into discrete elements each of which is bounded in both time and frequency, the duration ($\Delta t$) and bandwidth ($\Delta f$) of an elementary fluctuation being constrained by the 'uncertainty relation' or minimum-area condition:

$$\Delta f \times \Delta t \approx \tfrac{1}{2} \qquad (1)$$

Following the work of Gabor (in "Theory of Communication", J Inst Elect Engrs 93, pp. 429–457, 1946) such discrete elements are referred to as logons.

Discrete events occurring in inputs to practical dynamic systems may be described in terms of changes or increments in input-signal intensity. In the specification of discrete events the gradient (dx/dt) of an input signal x(t) is thus of more practical significance than the overall mangitude of x(t). In order to develop the theory of the present invention a particular form of the logon, referred to as a smooth increment, will be defined as a signal element satisfying the conditions:

a. the time history x(t) contains a smooth transition from a minimum to a maximum (or vice versa) over interval $\Delta t$, and b. the significant 'gradient energy' $\int (dx/dt)^2 \cdot dt$ associated with the signal gradient is constrained within intervals $\Delta t$ and $\Delta f$ satisfying equation (1) above.

It follows from condition (a) that $\Delta t$ corresponds approximately to one half-cycle at a center-frequency $f_0$ and hence that $2\Delta t \approx (f_0)^{-1}$ and (using condition (b) together with equation (1)) $\Delta f/f_0 \approx 1$.

Figure 3A:
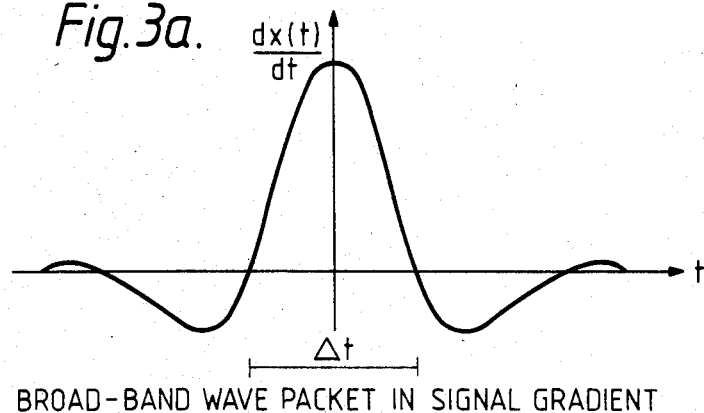
FIGS. 3a and 3b illustrate an increment.
Figure 3B:
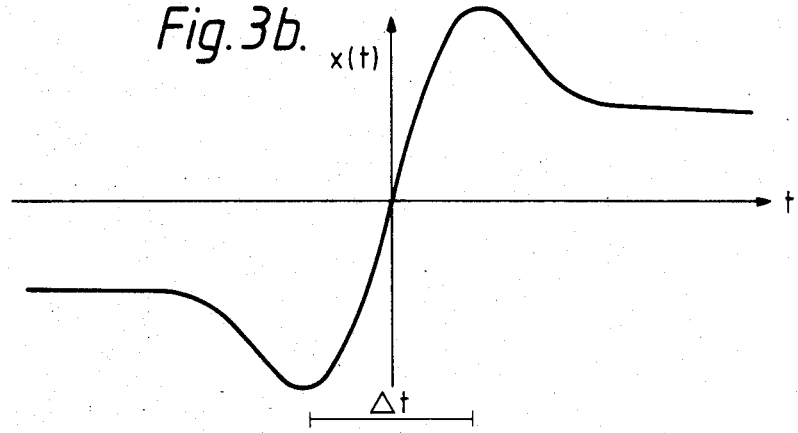
Figure 4A:
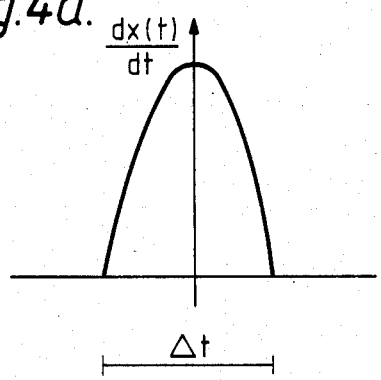
FIGS. 4a and 4b represent an approximation to the increment of FIGS. 3a and 3b.
Figure 4B:
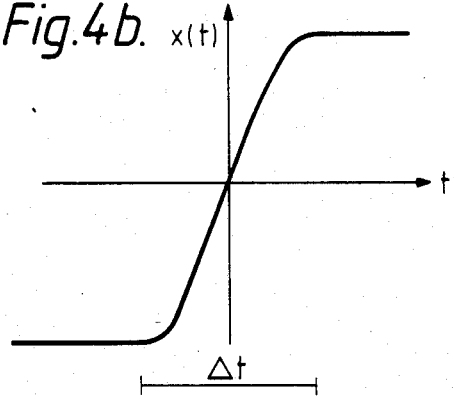

The 'octave-width' constraint, ie $\Delta f/f_0 \approx 1$, implies that the gradient of the signal takes the form of a broadband wave-packet (FIG. 3a). A smooth-increment profile is obtained by integration (FIG. 3b). A more convenient practical approximation for engineering design purposes is obtained by suppressing side bands (FIG. 4a) leading to a smooth-ramp profile (FIG. 4b). The effect of suppressing side bands in practical applications is small.

In a preferred embodiment of the present invention the means for band limiting the signal may be designed as increment detectors in accordance with the above definition, to act as a filter matched (in a way to be described) for input patterns of the form illustrated in FIG. 4b.

Figure 5:
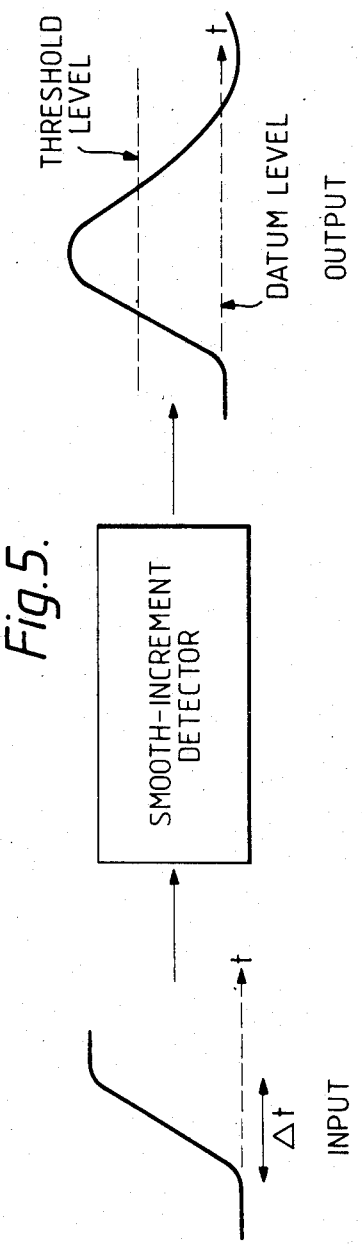
FIG. 5 illustrates the operation of an increment detector.

The increment detection process is essentially as illustrated in FIG. 5. On the occurrence of an input in the form of an increment of prescribed duration, the matched filter is required to respond with an output fluctuation in the form of a single smooth pulse, ideally with little overswing of the datum level. This requirement on the shape of the response pulse may be shown to impose the band-limiting constraint such that the filter band-width is of the order (but rather in excess of) one octave. The occurrence of an input of the prescribed form may then be associated with an output peak whose amplitude exceeds some threshold level (chosen with reference to the ambient background noise). In the more general situation a set of such threshold levels may be used to detect input increments of differing intensities.

Figure 6:
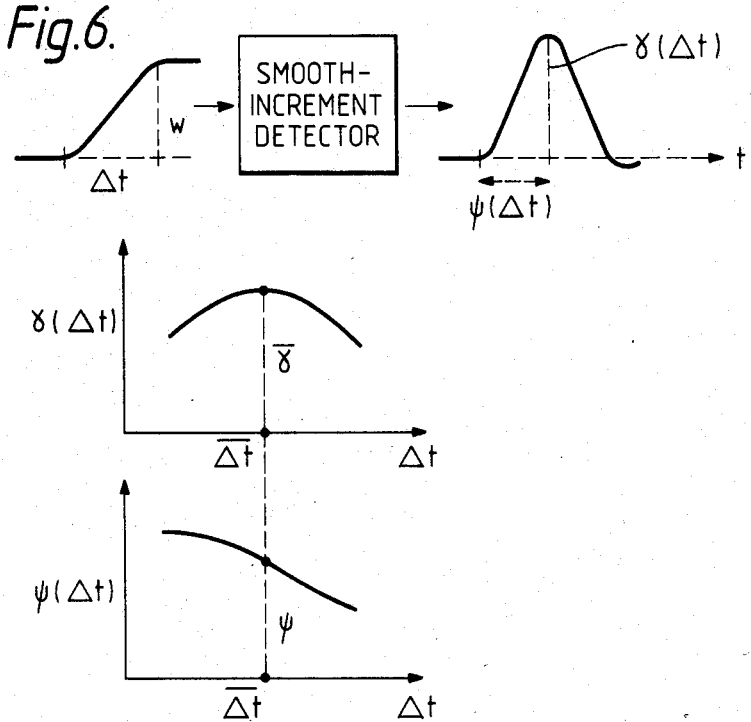
FIG. 6 illustrates numerical parameters defining an increment detector.

The sense in which the filter is matched to a smooth increment of given duration is illustrated in FIG. 6. Here the response-peak amplitudes $\gamma (\Delta t)$ are shown as a function of $\Delta t$ for a class of inputs whose amplitudes w take the form $w = \Delta t^k$, where $0 < k < 1$.

The condition $0 < k < 1$ implies that, while the amplitude w increases with increasing $\Delta t$, the mean gradient $w/\Delta t$ decreases. As a result the maximum output $\bar{\gamma}$ for a given band-limiting filter (FIG. 6) occurs in response to an increment whose duration equals some intermediate tuned time-interval $\overline{\Delta t}$.

While a fluctuation, above threshold level, in the response of a single filter carries information concerning the occurrence of an event of prescribed form in the system input, the joint responses of two such filters matched to the same system input carry in addition information concerning the proper functioning or health of the signals in which the band-limited channels are embedded. Two such filters will be said to be matched channels if they satisfy the relationships $$\overline{\Delta t_1} = \overline{\Delta t_2}, \ \overline{\gamma_1} = \overline{\gamma_2}, \ \overline{\psi_1} = \overline{\psi_2} \qquad (2)$$

The third condition above requires (FIG. 6) that, in response to their common tuned input, the output peaks occur at the same instant. Thus because of this time plane shaping, correlation may be subsequently performed by simple comparisons of the signals in the matched channels.

Although the design constraints on two matched channels, equations (2), refer specifically to response peaks, the bandwidth condition (ie $\Delta f/f_0 \approx 1$) imposed implies that signals having matched peaks will also be closely related over their whole amplitude range.

Having developed a theoretical basis, a practical implementation of the present invention will now be described in more detail.

Figure 7A:
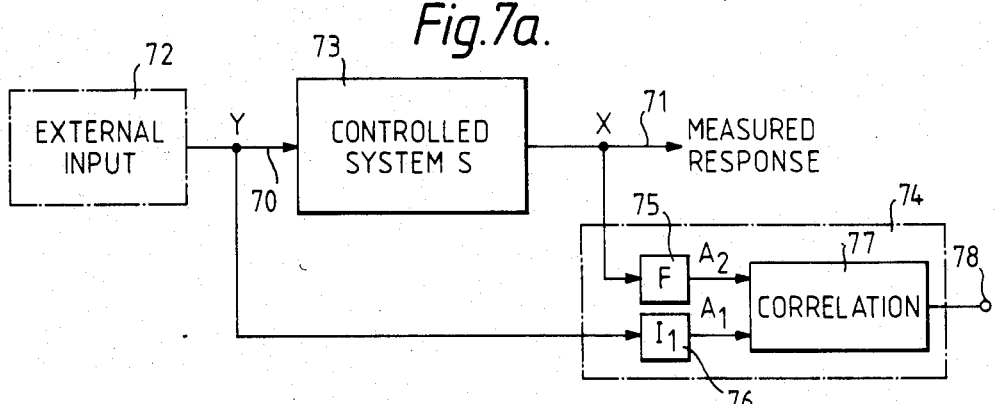
FIGS. 7a and 7b represent an embodiment of a control system monitor employing a directly measured input.

In a controlled system, signals will be present at many points in the system, but access for measurement for a control system monitor will only be available at various points in the system, such as on signals 70, 71 (FIG. 7a) being respectively a measured external input and a measured response of the controlled system 73. The response signal 71 may be fed into other parts of the controlled system, or provided for monitoring only.

A signal from measurement point Y is received by control system monitor 74 and band limited by increment detector 75 ($I_1$) to provide an output $A_1$ as described above. A signal from measurement point X is processed by filter 76 (F) to provide an output $A_2$. Outputs $A_1$ and $A_2$ are correlated by correlator 77 in accordance with the present invention to produce status flag 78. Measurement X cannot be directly compared with measurement Y, but is an indirect measurement of the input signal having been acted upon the transfer functions. Hence the combination of filler F together with transfer function S is arranged to behave as the increment detector $I_2$, shown in the schematic diagram FIG. 7b. It will be appreciated that some inputs to a controlled system (eg a gust acting on an aircraft) may only be measured indirectly.

In the present simple example (FIG. 7) the functioning of a control system part is monitored. Y could represent a pilot input, X the output of a rate sensor and S the transfer function of the total closed loop system, including both aircraft dynamics and control system effects. It will be appreciated that disparaties between $A_1$ and $A_2$ may arise through failure of any component in the closed loop, eg through failure of the sensor itself or through failure of the control law implementation (eg due to software errors in a flight control computer). This is a significant advance over prior art systems based on hardware redundancy, which could not detect a software failure. Failure may be flagged when for example ($A_1-A_2$) exceeds a predetermined threshold.

Figure 8A:
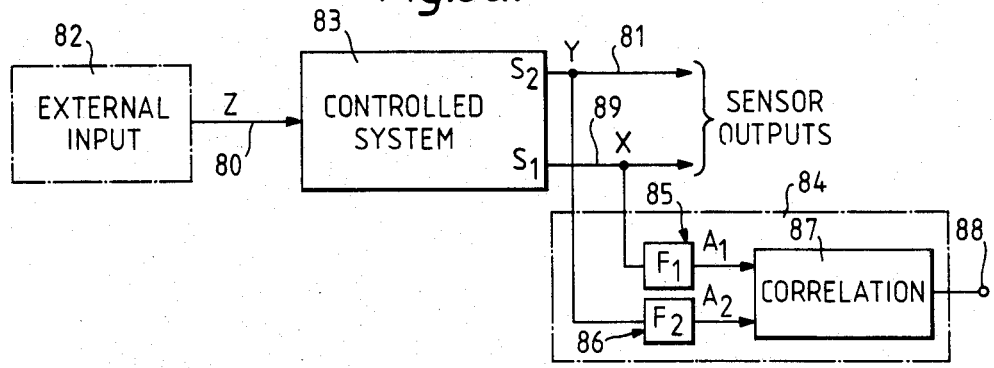
FIGS. 8a and 8b represent an alternative embodiment employing indirect measurement of an input.

A different situation is illustrated in FIG. 8a, in which the input 80 to a part of the controlled system 83 is not amenable to direct measurement, but two indirect measurements are available (89 and 81) having been acted upon by transfer functions $S_1$ and $S_2$. These measurements are filtered 85, 86 and correlated 87 to produce a status flag 88 in a similar way to the above, with the distinction that both combinations of transfer functions with filters ($S_1$ with $F_1$ and $S_2$ with $F_2$) are arranged to form increment detectors $I_1$ and $I_2$ in the schematic of FIG. 8b.

Some further examples of the present invention will now be described in which the presentation of FIGS. 7b and 8b will be used for clarity. It will be realized, however, that the physical connection of the monitor is of the form shown in FIGS. 7a and 8a. In an embodiment of the present invention arranged for aircraft control system monitoring in response to both pilot and gust inputs, sub-subsystems for gust input (FIG. 9(a)) and pilot input (FIG. 9(b)) may be identified.

Figure 8B:
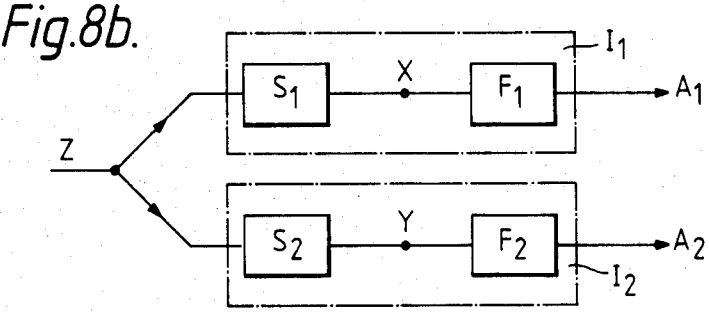
Figure 9A:
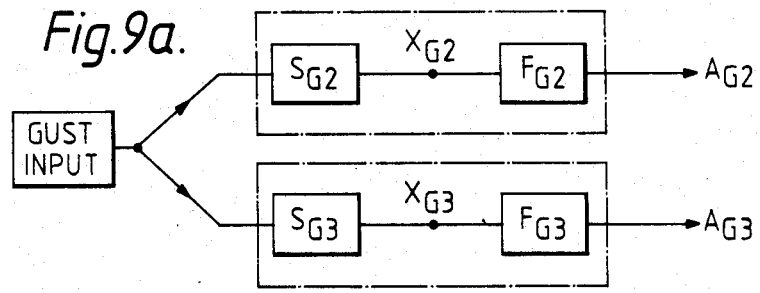
FIGS. 9a and 9b represent components of a monitor for an aircraft control system with pilot and gust input.

FIG. 9a illustrates the case of gust inputs alone (compare FIG. 8b). $X_{G2}$ and $X_{G3}$ are measured signals, for example outputs from two sensors such as pitch-rate and normal acceleration. Alternatively $X_{G2}$ or $X_{G3}$ might be an actuator-demand signal. The transfer functions $S_{G2}$ and $S_{G3}$ describe the responses of $X_{G2}$ and $X_{G3}$ to gust inputs, through the total closed loop system. The complementary filters $F_{G2}$ and $F_{G3}$ are designed so that the combinations of $S_{G2}$ and $F_{G2}$, and of $S_{G3}$ and $F_{G3}$, are matched increment detectors for gust inputs. In the absence of pilot inputs, comparison of signals $A_{G2}$ and $A_{G3}$, on the basis of the difference signals ($A_{G2}-A_{G3}$), could be used to check for mutual compatibility of the signals $X_{G2}$ and $X_{G3}$ over the common pass band.

Figure 7B:
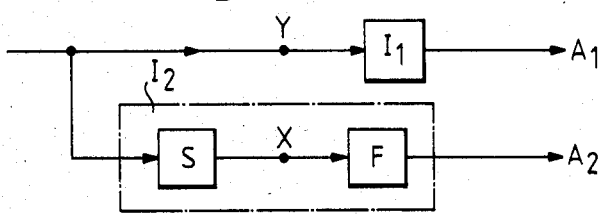
Figure 9B:
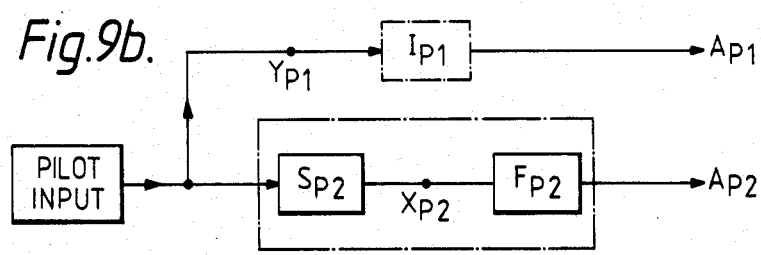

FIG. 9b illustrates the case of pilot inputs alone (compare FIG. 7b). The measured signal $X_{P2}$ is the response to a pilot input through a transfer function $S_{P2}$. $A_{P2}$ is the result of passing $X_{P2}$ through a complementary filter $F_{P2}$. The filter $I_{P1}$ acts directly on the control stick transducer signal $Y_{P1}$ to give an output $A_{P1}$ matched to $A_{P2}$.

In the complete system (FIG. 10) $X_2$ and $X_3$ respond to both pilot and gust inputs and take the form $$X_2 = X_{P2} + X_{G2}, \quad X_3 = X_{P3} + X_{G3}$$

Figure 10:
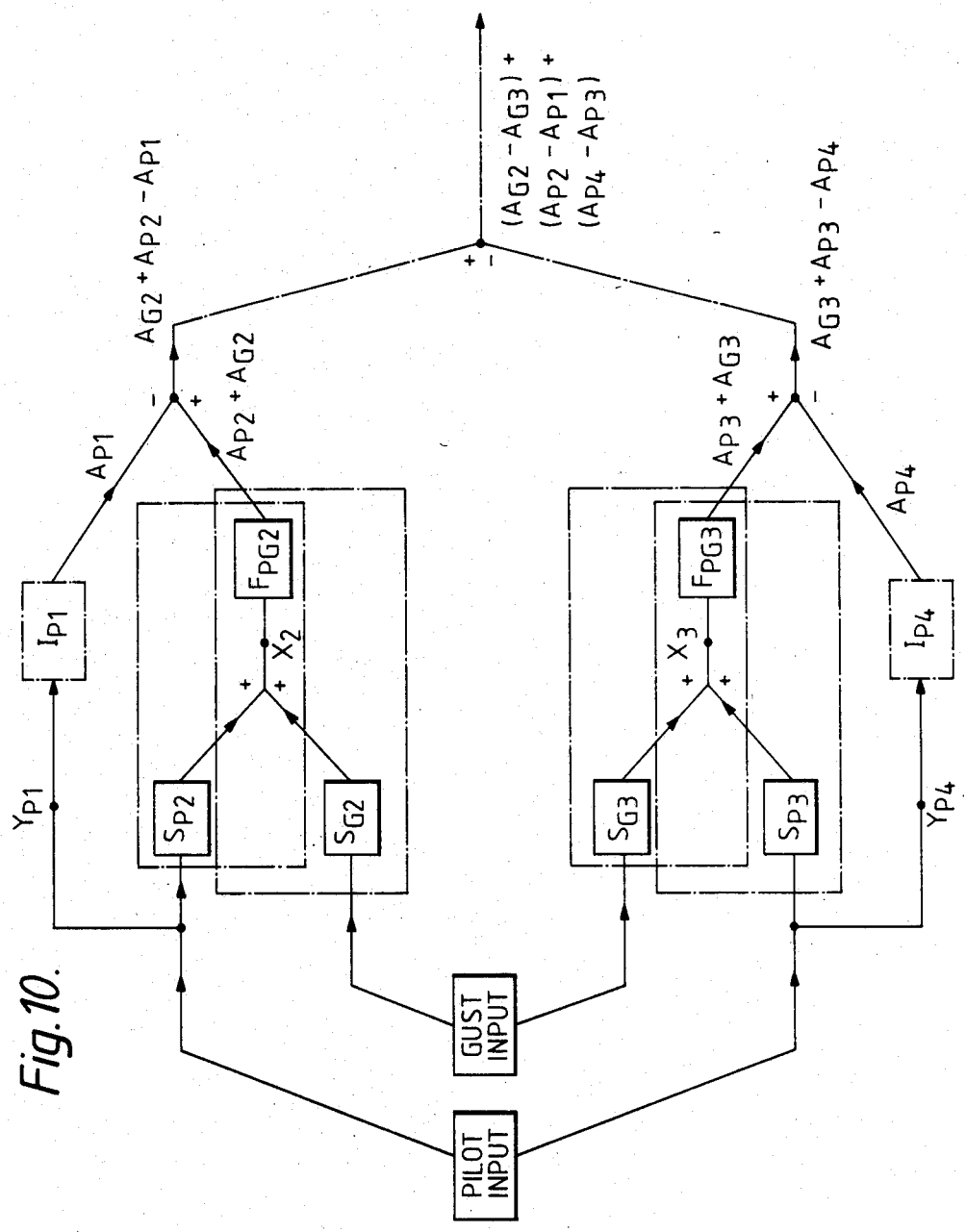
FIG. 10 represents an integrated form of the system of FIGS. 9a and 9b.

The system in FIG. 10 incorporates both subsystems shown in FIG. 9, with a common filter $F_{PG2}$ playing the role of filers $F_{P2}$ and $F_{G2}$. It is in general possible to design a single filter to play such a dual role, the design process being iterative with attention to both pilot and gust inputs so that the frequency-plane and time-plane constraints of an increment detector are met adequately by both $S_{P2} + F_{PG2}$, for increments in gust input, and $S_{G2} + F_{PG2}$, for increments in pilot input (see overlapping dashed boxes in FIG. 10).

In response to simultaneous pilot and gust inputs the matching of $A_{P1}$ to $A_{P2}$ (as in FIG. 9b) ensures that the difference ($A_{P2} - A_{P1}$) is small and hence that the output of the upper half of FIG. 10 is predominantly the gust component $A_{G2}$. Similarly, the output of the lower half of the embodiment of FIG. 10 is predominantly the gust component $A_{G3}$. $A_{G2}$ and $A_{G3}$ are themselves matched (as in FIG. 9a) so that the overall difference signal $$(A_{G2} - A_{G3}) + (A_{P2} - A_{P1}) + (A_{P4} - A_{P3})$$

comprises a sum of components each of which remains small during normal system operation. In conjunction with prescribed threshold amplitudes this signal may thus be used to flag possible system failures.

It will now be appreciated that the present invention provides a control system monitor which monitors the system on-line, without requiring any special test procedures. The problems and weaknesses associated with prior art systems for providing redundancy may be overcome since a positive indication of failure, including a software error, is provided by the present invention.

What is claimed is:

1. An aircraft control system having a control system monitor, said monitor comprising:
   plural means arranged for receiving purposively dissimilar signals from points in the system representative of pilot and gust inputs;
   plural means for band limiting each signal;
   means for detecting increments in the band limited signals and for correlating said increments; and
   means for examining the correlation to indicate a system failure if a predetermined correlation level is not reached.

2. A control system monitor for a control system in which the application of an input control signal is designed to result in an output signal having a known relationship to the input control signal, the monitor comprising:
   plural means for receiving corresponding input and output signals from points in the system;
   plural means for detecting increments in said input and output signals by continuously band limiting each signal, detecting peak values of said band limited signals and correlating corresponding peak values; and means for examining the correlation to indicate a system failure if a predetermined correlation level is not satisfied.

3. A control system monitor as claimed in claim 2 in which the means for detecting increments comprise matched filters.

4. A control system monitor as claimed in claim 2 wherein each of said means for receiving signals comprises an indirect measurement of signals at points in the system and includes a filter which is complementary to the transfer function of that part of the system providing the indirect measurement, such that the transfer function and complementary filter together provide signal band limiting means.

5. A control system as claimed in claim 2 including differencing means to asess satisfaction of the predetermined correlation level.

* * * * *